US009020910B2

(12) United States Patent
Bendel et al.

(10) Patent No.: US 9,020,910 B2
(45) Date of Patent: Apr. 28, 2015

(54) STORING TABLES IN A DATABASE SYSTEM

(75) Inventors: Peter Bendel, Holzgerlingen (DE);
Marco Czech, Tuebingen (DE); Oliver C. Koeth, Stuttgart (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/906,303

(22) Filed: Oct. 18, 2010

(65) Prior Publication Data
US 2011/0173164 A1 Jul. 14, 2011

(30) Foreign Application Priority Data

Jan. 13, 2010 (EP) ..................................... 10150617

(51) Int. Cl.
*G06F 17/30* (2006.01)
(52) U.S. Cl.
CPC ................................ *G06F 17/30501* (2013.01)
(58) Field of Classification Search
CPC .................... G06F 17/30445; G06F 17/30498; G06F 17/30466; G06F 17/30536
USPC ........................................................ 707/693
See application file for complete search history.

(56) References Cited

U.S. PATENT DOCUMENTS

| 8,185,508 | B2* | 5/2012 | Vemuri et al. | 707/702 |
| 2004/0249810 | A1* | 12/2004 | Das et al. | 707/5 |
| 2007/0033354 | A1* | 2/2007 | Burrows et al. | 711/156 |
| 2009/0006399 | A1* | 1/2009 | Raman et al. | 707/7 |
| 2009/0024568 | A1* | 1/2009 | Al-Omari et al. | 707/2 |
| 2009/0100002 | A1* | 4/2009 | Nolan et al. | 707/2 |

OTHER PUBLICATIONS

Vijayshankar Raman et al., "Constant-Time Query Processing," pp. 60-69, KnowledgeGate from IBM Market Insights, IEEE Xplore, 2008.

* cited by examiner

*Primary Examiner* — Apu Mofiz
*Assistant Examiner* — Jared Bibbee
(74) *Attorney, Agent, or Firm* — Cantor Colburn LLP; Ingrid Foerster

(57) ABSTRACT

A method for processing data contained in tables in a relational database includes joining a first table and a second table into a joined table determining metadata for at least one column of a table of the following tables: the first table, the second table, and the joined table. The metadata is used for processing data in the at least one column of the table, and for processing data in at least one column of at least one other table of the following tables: the first table, the second table, and the joined table.

15 Claims, 6 Drawing Sheets

16

| Product Name | Product Price | Supplier Name | Supplier Country |
|---|---|---|---|
| ... | ... | ... | ... |
| Power Drill „SuperX-3" | $ 249.- | Drillo Corp. | China |
| Power Drill „SuperX-4" | $ 299.- | Drillo Corp. | China |
| Power Drill „SuperX-5" | $ 399.- | Drillo Corp. | China |
| ... | ... | ... | ... |
| Riveting Gun „Extra" | $ 895.- | FastJoin Inc. | Mexico |
| ... | ... | ... | ... |
| Drill Bit Set „Mega-1" | $ 4.99 | Holo S.A. | Mexico |
| Drill Bit Set „Mega-2" | $ 7.99 | Holo S.A. | Mexico |
| ... | ... | ... | ... |

| Sales ID | Date | Product Name | # of items sold | Product Price | Supplier Name | Supplier Country | Customer Name |
|---|---|---|---|---|---|---|---|
| ... | ... | ... | ... | ... | ... | ... | ... |
| 3296830 | 2008-01-12 | Riveting Gun „Extra" | 1 | $ 895.- | FastJoin Inc. | Mexico | Meyer |
| 3296831 | 2008-01-15 | Power Drill „SuperX-4" | 2 | $ 299.- | Drillo Corp. | China | Jones |
| 3296832 | 2008-01-15 | Drill Bit Set „Mega-1" | 3 | $ 4.99 | Holo S.A. | Mexico | Jones |
| 3296833 | 2008-01-15 | Power Drill „SuperX-3" | 1 | $ 249.- | Drillo Corp. | Mexico | Lang |
| 3296834 | 2008-02-03 | Power Drill „SuperX-5" | 1 | $ 399.- | Drillo Corp. | China | Smith |
| 3296835 | 2008-02-03 | Drill Bit Set „Mega-2" | 2 | $ 7.99 | Holo S.A. | Mexico | Smith |
| 3296836 | 2008-02-15 | Drill Bit Set „Mega-1" | 5 | $ 4.99 | Holo S.A. | Mexico | Wayne |
| 3296837 | 2008-02-15 | Power Drill „SuperX-4" | 2 | $ 299.- | Drillo Corp. | China | Baker |
| ... | ... | ... | ... | ... | ... | ... | ... |

FIG. 3e

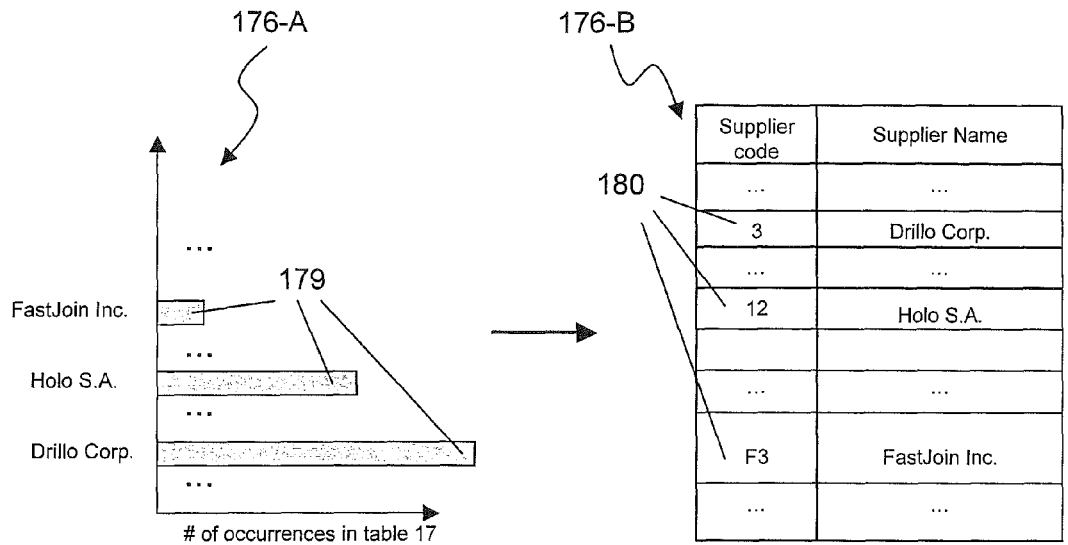

FIG. 4a

| Sales ID | Date | Product Name | # of items sold | Product Price | Supplier Code | Supplier Country | Customer Name |
|---|---|---|---|---|---|---|---|
| ... | ... | ... | ... | ... | ... | ... | ... |
| 3296830 | 2008-01-12 | Riveting Gun „Extra" | 1 | $ 895.- | F3. | Mexico | Meyer |
| 3296831 | 2008-01-15 | Power Drill „SuperX-4" | 2 | $ 299.- | 3 | China | Jones |
| 3296832 | 2008-01-15 | Drill Bit Set „Mega-1" | 3 | $ 4.99 | 12 | Mexico | Jones |
| 3296833 | 2008-01-15 | Power Drill „SuperX-3" | 1 | $ 249.- | 3 | Mexico | Lang |
| 3296834 | 2008-02-03 | Power Drill „SuperX-5" | 1 | $ 399.- | 3 | China | Smith |
| 3296835 | 2008-02-03 | Drill Bit Set „Mega-2" | 2 | $ 7.99 | 12 | Mexico | Smith |
| 3296836 | 2008-02-15 | Drill Bit Set „Mega-1" | 5 | $ 4.99 | 12 | Mexico | Wayne |
| 3296837 | 2008-02-15 | Power Drill „SuperX-4" | 2 | $ 299.- | 3 | China | Baker |
| ... | ... | ... | ... | ... | ... | ... | ... |

FIG. 4b

STORING TABLES IN A DATABASE SYSTEM

CROSS-REFERENCE TO RELATED APPLICATIONS

This application claims priority to European Patent Application No. EP10150617, filed 13 Jan. 2010, and all the benefits accruing therefrom under 35 U.S.C. §119, the contents of which in its entirety are herein incorporated by reference.

BACKGROUND

The invention relates to generally to a method and a system for optimizing data storage in a row-oriented relational database containing data sets with multiple attributes. Specifically, the invention provides a method and a system for optimally using main memory storage space available for storing tables in a data warehouse system.

Data warehouses are database systems geared at electronically storing a business organization's data in such a way as to facilitate reporting and analysis. In order to accomplish this, data from various sources are collected and integrated into the data warehouse. Moreover, business intelligence tools are provided which enable performing comprehensive evaluations of the collected data and extracting information for supporting business decisions.

Generally, a data warehouse contains a host of distributed and differently structured data. In order to make optimal use of the available memory, the stored data is compressed, for example, by using a frequency-partitioned dictionary approach such as the one described in "Constant-Time Query Processing" by V. Raman et al., Data Engineering, ICDE 2008, IEEE $24^{th}$ International Conference on Data Engineering, p. 60-69. In the course of this compression, metadata such as frequency distributions and dictionaries are evaluated and associated with the columns of the database tables. This metadata is expensive to compute and requires storage space. Thus, while data compression techniques reduce the memory space required for storing the data, they generally generate a significant amount of metadata which require memory, thus reducing the amount of memory available for storing actual data.

The problem of reduced available free memory due to metadata storage requirements is aggravated whenever the database system is distributed over a cluster of computers connected by a network. In order to achieve even load distribution in the cluster, data are generally partitioned across the cluster nodes without regard to individual values. This requires the complete metadata to be available on each cluster node. Therefore, the amount of memory needed to store the system's metadata increases linearly with the number of cluster nodes, thereby eventually limiting the scalability of the system.

In order to accelerate and facilitate the execution of queries against the database, materialized views are generated which contain all information required for executing a given query. Materialized views are calculated by (partial) denormalization of the underlying database scheme which results in multiple additional views of the underlying data, thus increasing the metadata overhead: In order to enable efficient denormalization, database systems generally use a staged approach in which join operations are performed one after the other. Thus, whenever denormalization requires multiple joins, multiple intermediate joined tables (corresponding to the various join levels) result. These intermediate joined tables need to be retained as additional materialized views for various purposes and, as a consequence, require their own metadata.

In order to enable fast query execution, materialized views containing data for executing the queries have to be present in main memory where storage space is very limited. Other views/tables not immediately needed may be stored on disk where storage space is limited, but less scarce than in main memory.

BRIEF SUMMARY

According to one aspect, a method for processing data contained in tables in a relational database includes joining a first table and a second table into a joined table; determining metadata for at least one column of a table of the following tables: the first table, the second table, and the joined table; using the metadata for processing data in the at least one column of the table; using the metadata for processing data in at least one column of at least one other table of the following tables: the first table, the second table, and the joined table.

According to a further aspect, a data processing system for processing data contained in tables in a relational database includes a database table joining system configured to join a first table and a second table into a joined table; a metadata computation system configured to determine metadata for at least one column of a table of the following tables: the first table, the second table, and the joined table; and a column processing system configured to use the metadata for processing data in the at least one column of the table, and to use the metadata for processing data in at least one column of at least one other table of the following tables: the first table, the second table, and the joined table.

According to a further aspect, a data processing system for processing data contained in tables of a relational database includes a database table joining system configured to join a first table and a second table of the database into a joined table; a metadata computation system configured to determine metadata for at least one column of the joined table; and a column processing system for processing tables comprising the at least one column using the metadata.

According to another aspect, a computer readable storage medium having computer readable instructions stored thereon, that, when executed by a computer, implement a method for processing data contained in tables of a relational database in a computing system. The method includes joining a first table and a second table into a joined table; determining metadata for at least one column of a table of the following tables: the first table, the second table, and the joined table; using the metadata for processing data in the at least one column of the table; and using the metadata for processing data in at least one column of at least on other of the following tables: the first table, the second table, and the joined table.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in:

FIG. 2b is a diagram showing an iterative joining of selected tables of the database schema of FIG. 2a;

FIG. 3a is a detailed diagram of selected rows and columns of SALES table of FIG. 2a;

FIG. 3b is a detailed diagram of selected rows and columns of PRODUCTS table of FIG. 2a;

FIG. 3c is a detailed diagram of selected rows and columns of SUPPLIERS table of FIG. 2a;

FIG. 3d is a detailed diagram of selected rows and columns of an intermediate joined table 16 as obtained by joining SUPPLIERS table of FIG. 3c and PRODUCTS table of FIG. 3b;

FIG. 3e is a detailed diagram of selected rows and columns of an accelerated queries table 17 as obtained by joining intermediate join table of FIG. 3d and SALES table of FIG. 3a;

FIG. 4a is metadata as obtained from applying a frequency-partitioned dictionary method on "supplier name" column of accelerated queries table 17 of FIG. 3e;

FIG. 4b is a detailed diagram of selected rows and columns of accelerated queries table 17 of FIG. 3e, after compressing "supplier name" column using the metadata of FIG. 4a;

Figure 1:
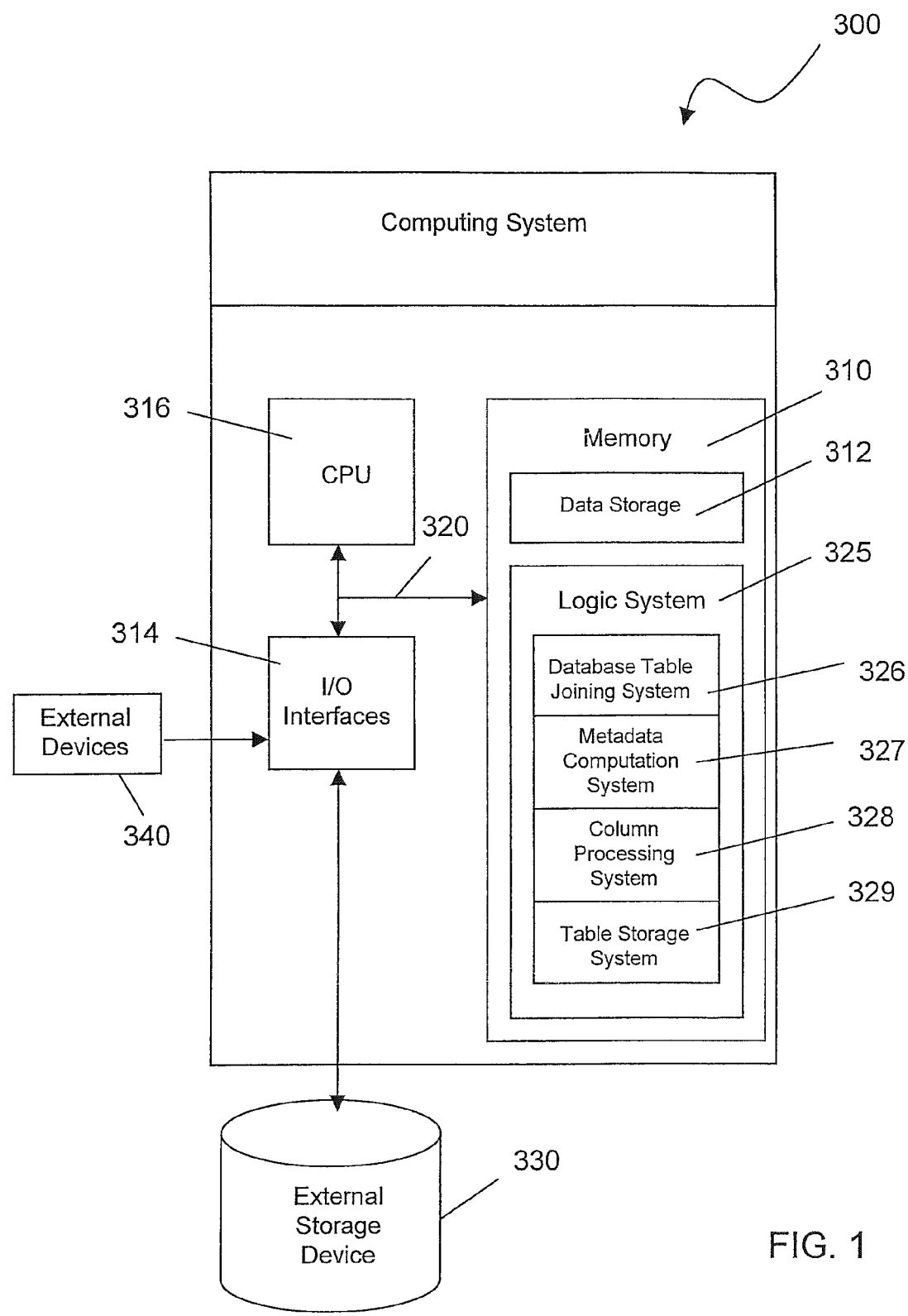
FIG. 1 is a database computer system with an efficient storage mechanism for database tables in accordance with a preferred embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

As used herein, metadata refers to any column attributes that are needed for regular operation of a database system. Some examples of such column attributes are "data type", "scale", "precision", data encoding information such as code page or Coded Character Set Identifier (CCSID), statistical information (e.g. highest/lowest value or distribution of values in a column), and logging-related information. A further specific example of metadata (column attributes) is information relating to compression of values in a database column. In this specific case, metadata involves compression parameters, such as frequency distributions (histograms) and/or dictionaries.

Metadata sharing may be advantageous for processing data in tables in general, not only for compression of data in table columns using shared compression parameters. Metadata may thus be shared also even when data table compression does not occur. Sharing metadata guarantees consistency across multiple tables that have columns using the same metadata. In addition, the metadata is stored only once (non-redundantly), resulting in compression of the metadata itself Metadata relating to column attributes is typically rather small (just a few kilobytes (kB)) compared to the user data in the table (potentially terabytes (TBs)), but the compression of metadata may still make the use of available resources in a more efficient manner.

In the following, compression of data in database tables is used as an example of processing data in connection with metadata sharing. As mentioned in the previous paragraphs, it should be appreciated that metadata sharing may be done in connection with any processing of data (that is, with or without compression of data in the tables).

In view of the above described considerations, it would be desirable to have a data storage concept which maximizes the main memory space available for storing data immediately needed for querying, while avoiding excessive computing expenditure related to data compression of the database tables and views. Accordingly, the embodiments disclosed herein provide an efficient method for compressing and for storing tables in a database system, for example in a data warehouse system. More specifically, the embodiments herein store tables and materialized views in a database system in such a way that main memory space is efficiently used. In addition, the embodiments described herein keep computing efforts related to data compression at a reasonable rate.

FIG. 1 shows an exemplary embodiment of a database computer system 300, in particular a data warehouse system for collecting a large variety of data in a database and carrying out business analytics on this database. As depicted, computer system 300 generally comprises main memory 310, input/output (I/O) interfaces 314, a central processing unit (CPU) 316, bus 320, external storage devices 330 and external devices/resources 340.

Main memory 310 comprises a logic system 325, as well as a data storage region 320. Main memory 310 may comprise any known type of data storage and/or transmission media, including magnetic media, optical media, random access memory (RAM), read-only memory (ROM), a data cache, a data object etc. Main memory 310 may reside at a single physical location, comprising one or more types of data storage. Generally, however data warehouse systems utilize relational databases and are "distributed" in the sense that the data, rather than residing in storage devices 310, 330 attached to a common CPU 316, are stored in multiple computers which may be located in the same physical location or may be dispersed over a network. Correspondingly, main memory 310 and external storage devices 330 of data warehouse system 300 will be distributed across a plurality of physical systems in various forms. CPU 316 may likewise comprise a single processing unit, or be distributed across one or more processing units in one or more locations, e.g., on a client and server.

I/O interfaces 314 may comprise any system for exchanging information from an external source. External devices 340 may comprise any known type of external device, including keyboard, mouse, voice recognition system, printer, monitor, facsimile etc. Bus 320 provides a communication link between each of the components in the computer system 300 and likewise may comprise any known type of transmission link, including electrical, optical, wireless etc. In addition, although not shown, additional components such as cache memory, communication systems, system software etc. may be incorporated into computer system 300.

External storage devices 340 provide storage for the data warehouse database as well as for information related to structuring, retrieving, analyzing, storing etc. its data. Such information could include, inter alia: (1) data warehouse schemas; (2) business intelligence tools, (3) tools for extracting and retrieving metadata, etc. External storage devices 340 may include one or more storage devices, such as a magnetic disk drive or an optical disk drive. More generally, as indicated above, external storage devices 340 may include data distributed across, for example, a local area network (LAN), wide are network (WAN) or a storage area network (SAN) (not shown in FIG. 1). External storage devices 340 may also be configured in such a way that one of ordinary skill in the art may interpret it to include one or more storage devices. Moreover, it should be understood that external storage devices 340 could alternatively exist within computer system 300.

External storage devices 340 together with main memory 310 provide storage for the various tables of the relational database of the data warehouse system. Many data warehouses are "in-memory" database systems in the sense that the data warehouse primarily relies on main memory 310 for storage of so-called "accelerated query tables" containing data which are to be queried (in contrast to database management systems which employ disk storage mechanisms). In-memory database systems provide fast and predictable data accessing mechanisms and therefore are often used in applications where response time is a critical factor.

Figure 2A:
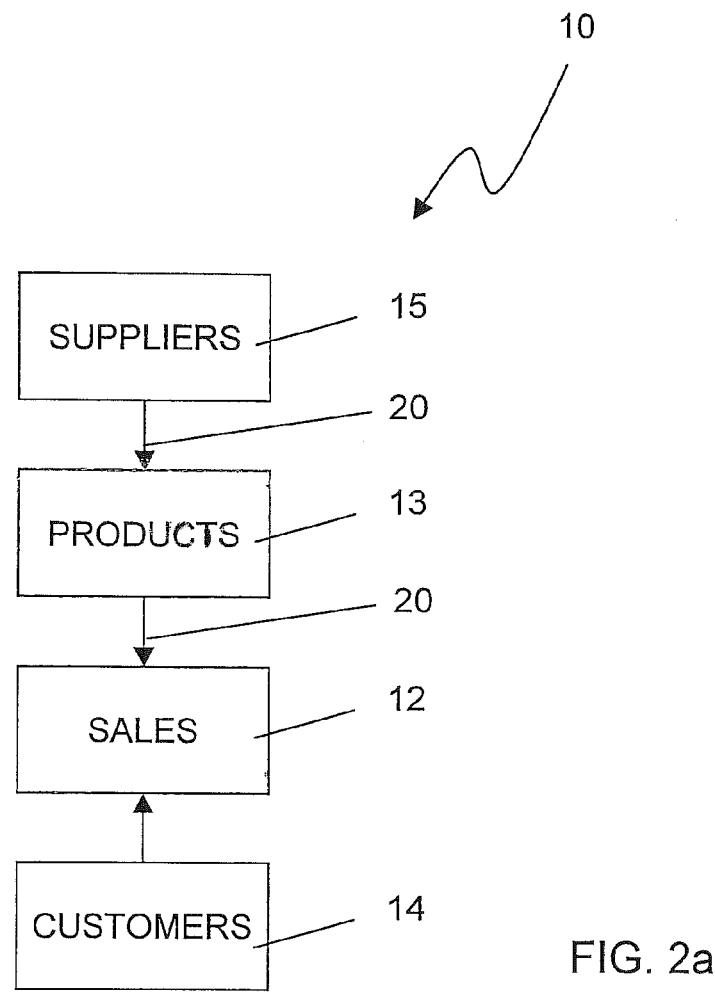
FIG. 2a is an exemplary diagram of a database schema in accordance with an embodiment of the invention.

As a simple example of a relational database stored within data warehouse computer system 300, FIG. 2 shows a diagram of a database schema 10 in which each box denotes a table and arrows 20 between the tables indicate which tables may be joined together. Database schema 10 comprises a fact table 12 (SALES) referring to dimension tables 13, 14 containing information about PRODUCTS sold and CUSTOMERS, respectively. Fact table 12 (SALES) combines information from dimension tables 13 (PRODUCTS) and 14 (CUSTOMERS) and assigns "measures" (such as date and number of items sold) to the combination, so that fact table 12 (SALES) stores "how many items of which product were sold on which date to which customer".

Figure 3A:
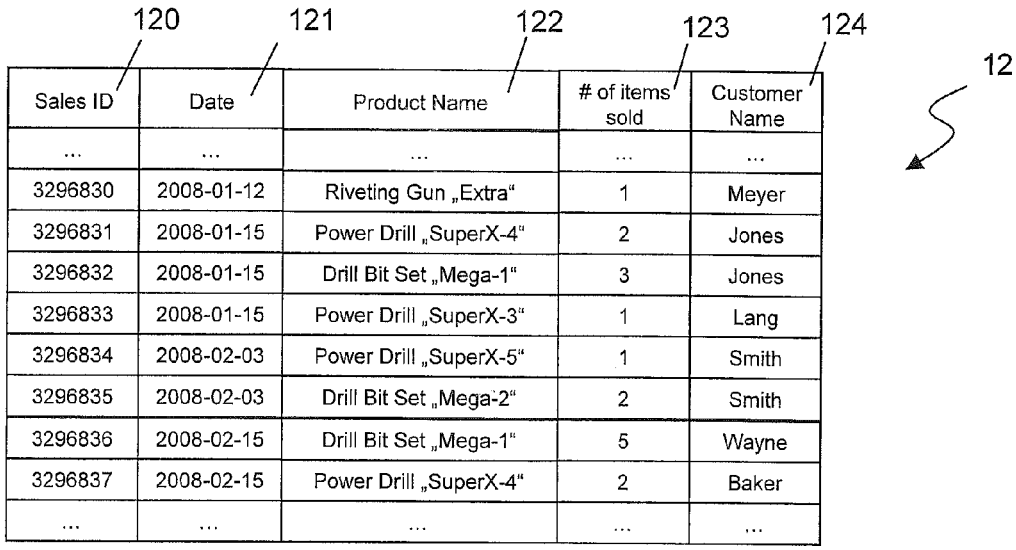
Figure 3B:
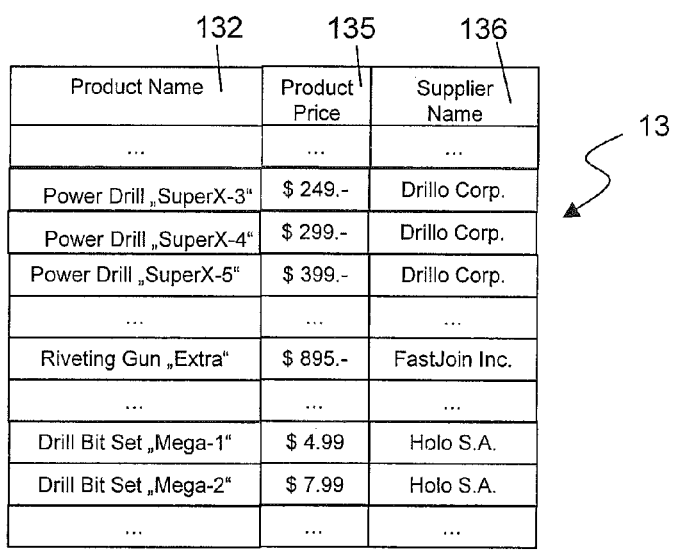
Figure 3C:
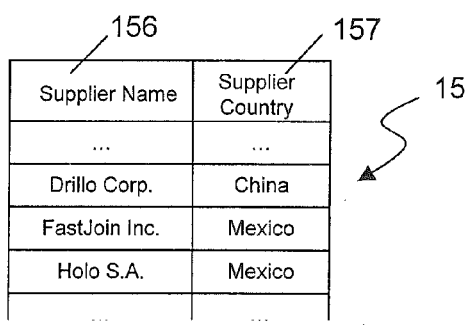

A detailed example of sample contents of fact table 12 is shown in FIG. 3a. Fact table 12 contains a column 120 of the sales ID, a column 121 with the sales date, a column 122 with the product name, column 123 with the number of items sold and column 124 with the customer name. Information about supplier as well as product price can be attached to each product, resulting in a normalized PRODUCTS table 13, a detailed example of which is shown in FIG. 3b. Moreover, information about country of origin can be attached to each supplier, resulting in a normalized SUPPLIERS table 15, a detailed example of which is shown in FIG. 3c. It will be noted that SALES table 12 is the parent table for PRODUCTS table 13, and PRODUCTS table 13 is the parent for SUPPLIERS table 15.

In order to boost query performance, the database management system generates "accelerated query tables", i.e., materialized views in which certain query results are cached as concrete tables that may be updated from the original base tables from time to time. This enables much more efficient access, at the cost of some data being potentially out-of-date. It is most useful in data warehousing scenarios, where frequent queries of the actual base tables can be extremely expensive. It is a characteristic of data warehouse systems that update operations are infrequent and come in batches. With such an update pattern, precomputing results is possible because updating the precomputed results is also infrequent.

As an example, FIG. 3e shows an accelerated query table 17 generated by joining tables 15, 13 and 12. This accelerated query table 17 contains information (i.e. columns) required for executing a query like "How much revenue was generated within a given period of time (e.g., in February 2008) with products originating from a given country (e.g., China)?" Accelerated query table 17 is attained by consecutively joining tables 15, 13 and 12 in one-by-one joining operations:

An intermediate joined table 16 is computed by performing a join of SUPPLIERS table 15 and PRODUCTS table 13 (see FIG. 3d); this intermediate joined table 16 contains all columns of tables 15 and 13.

Subsequently, the accelerated query table 17 is computed by performing a join of intermediate joined table 16 and SALES table 12 (see FIG. 2e); this final joined table 17 contains all columns of tables 16 and 12.

Figure 2B:
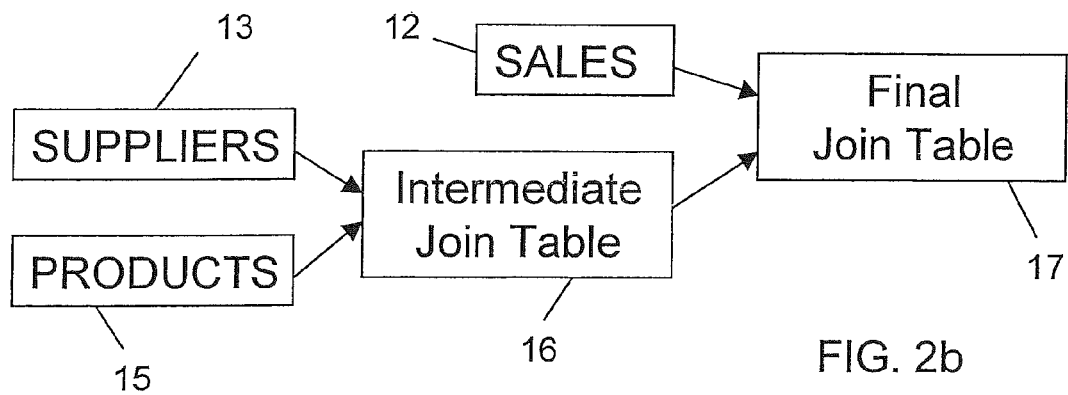

FIG. 2b illustrates a schematic of the join operations necessary for obtaining accelerated query table 17.

The intermediate joined table 16 and accelerated query table 17 inherit their column attributes from tables 12, 13 and 15. Thus, the data types, precision etc. of descendent tables 16, 17 are determined by their ancestor tables 15, 13 and 12. In order to avoid duplicating this information, these column attributes are represented only once in memory, so that, for example, tables 13, 16 and 17 refer to the same set of attributes of the column "supplier name" which originally stems from table 13 (and so on for other tables).

Generally, the amount of data contained in tables within a data warehouse can be very large. Typically, tables comprise a large number of rows, and column entries contain alphanumerical descriptions, the storage of which is very inefficient and costly. Thus, in order to reduce storage space, data have to be compressed. Efficient compression is most necessary for those tables which are stored in main memory 312, notably the accelerated query tables 17 which are used for executing specific queries.

Various methods of data compression have been developed for reducing the amount of memory required for storing these tables. In many of these methods, metadata are generated which are used for compressing/decompressing the data within this table. A very efficient data compression method using a frequency-partitioned dictionary approach is described in detail in "Constant-Time Query Processing" by V. Raman et al., Data Engineering, ICDE 2008, IEEE 24$^{th}$ International Conference on Data Engineering, p. 60-69, the contents of which are incorporated by reference herein in their entirety. Following this method, each column of a given table is compressed separately. Generally, long codes are assigned to the values of a particular column since all codes must be unique. The length of the code is determined by the number of the distinct values that need to be represented. In order to reduce storage space, short codes may be used for the most-frequent ones. Thus, the most frequent values that occur in a particular column are encoded with short codes only, while less frequent values are assigned longer codes. The correspondence between the individual values and their codes are contained in a dictionary table which is stored together with the compressed data, thus enabling decompression whenever needed.

As an example, it is assumed that "Supplier Name" column 176 of accelerated query table 17 is to be compressed using a frequency-partitioned dictionary approach. In a first step, the values occurring in "Supplier Name" column 176 are analyzed with respect to their frequency of occurrence in column 176. FIG. 4a shows a histogram 176-A depicting the various supplier entries together with their respective frequency of occurrence in column 176 of final joined table 17. As shown, column 176 of final joined table 17 contains more occurrences of supplier "Drillo Corp." than of supplier "Holo S.A.", (reflecting the fact that there were more sales involving Drillo products than Holo products). Based on this histogram, codes are assigned to the column entries in such a way that values occurring very often are assigned short codes (requiring very little storage space) whereas values occurring rarely are assigned longer codes (requiring more storage space). Thus, the supplier "Drillo Corp." (occurring very often) is assigned very short code, whereas the supplier "Holo S.A." (occurring less often) is assigned a longer code.

The correspondences between the alphanumerical product name and the ID number is stored in a dictionary table 176-B. This dictionary table 176-B represents so-called metadata associated with column 176 of accelerated query table 17. Subsequently, all values of the "supplier name" column 176 in accelerated query table 17 are replaced by the corresponding code, yielding accelerated query table 17' as shown in FIG. 4b. While metadata 176-B requires storage space, thus reducing the amount of memory available for storing actual data, the storage savings gained by compressing the data contained in column 176 will typically, by far, outweigh this storage expenditure.

Analogously, the alphanumerical entries of data columns 171-175 and 177 of final joined table 17 may be compressed by applying the frequency-partitioned dictionary approach, i.e., by assigning ID codes to each date entry according to its frequency of occurrence these columns.

This data compression method may in principle be applied to all tables within the database, thus minimizing storage space. In so doing, however, a lot of computing effort is required (associated with evaluating histograms and compiling dictionaries). Thus, a reasonable balance between minimizing storage space and minimizing compression efforts has to be found. In particular, tables residing within main memory 312 (where storage space is scarce) should be compressed more strongly than tables residing on disk 340 where storage space is less restricted. For data warehouse applications, the most important goal is to get minimal size and optimal query performance for those tables that are actually used for on-line query processing (i.e., the accelerated query tables). These accelerated query tables are typically at the deepest level of denormalization and therefore contain the largest volume of data (rows and columns) and have the largest impact on memory utilization and query processing time.

Thus, the optimal metadata (frequency partitioning and dictionary) are computed for each column of these accelerated query tables, based on the value distribution that occurs for the column in this table. As a consequence, the data within the accelerated query tables to be held in main memory 310 are compressed as much as possible, even if this is very costly with respect to computing time. Other tables which may be necessary for computing the materialized view, but are not immediately required for query execution, can be stored on disk 340 where storage space is more ample. Thus, they need not be compressed quite as strongly, and computing expenditure associated with compression may be saved.

Figure 5:
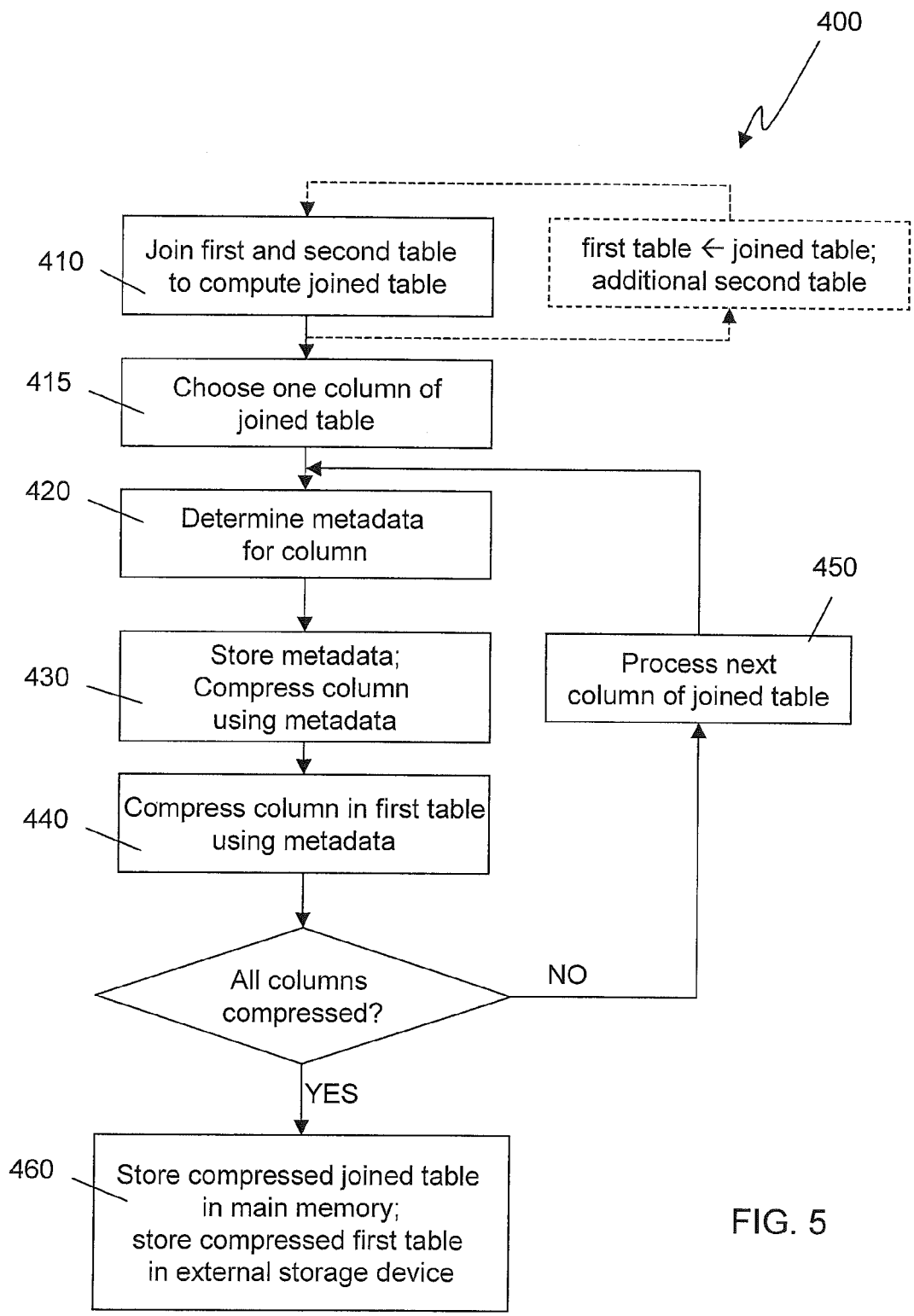
FIG. 5 is a flow diagram of a preferred embodiment of a method for efficient storage of tables of a relational database in the computer system of FIG. 1.

FIG. 5 shows a flow diagram of a method 400 for efficient data storage in a database computer system 300. As part of this method 400, an accelerated query table 17 is generated by a join operation from two (normalized and/or denormalized) tables 16, 12 of this database, and these tables 17, 16, 12 are efficiently stored in main memory 312 and storage devices 340 of the database computing system 300.

It is assumed that the SALES revenue generated within a given period of time with products originating from a given country is to be analyzed, and that accelerated query table 17 is to be stored in main memory 310 of computing system 300. Constituting tables 12, 16 will typically be stored in storage devices 340 (e.g. disk), since they are not accessed by a query. The specific parent/child relationship of the accelerated query table 17 to other tables within database schema 10 is inherently determined by the type of join operation applied. Thus, the set of tables related by a direct lineage to the accelerated query table 17 is known. For example, a direct lineage (child/parent/grandparent) relates accelerated query table 17 to tables 16, 15, 13 and 12, while no direct lineage exists between tables 16 and 12 (see FIG. 2*b*).

Method 400 sets out with generating the required accelerated query table 17 by joining tables 16 and 12 (step 410). Here, multiple joining operations may have to be performed to obtain accelerated query table 17 from base tables of the database. In the example of FIGS. 3*a*-3*e*, base tables 13 and 15 need to be joined to form intermediate table 16, and intermediate table 16 needs to be joined with base table 12 to form accelerated query table 17, so that two consecutive join operations are necessary for generating accelerated query table 17.

In order to make optimal use of storage space in main memory 310 where accelerated query table 17 is stored, accelerated query table 17 is compressed using the frequency-partitioned dictionary approach outlined above. Metadata (i.e., dictionaries) are computed for the columns of accelerated query table 17 (step 420), preferably in such a way that the data within these columns of accelerated query table 17 are optimally compressed (step 420). Subsequently, these metadata are used for compressing the data within the columns and are stored together with the accelerated query table 17 in main memory 310 (step 430).

In the example of FIGS. 3*a*-3*e*, supplier name column 176 of accelerated query table 17 is analyzed by inspecting its histogram 176-A, and dictionary 176-B, corresponding to metadata, is evaluated (step 420). This dictionary 176-B is stored and is used for compressing the supplier name column by translating the alphanumerical values of column 176 into hexadecimal codes (step 430), the result of which is shown in FIG. 4B.

Subsequently, the metadata generated in step 420 are used for compressing the corresponding column of the parent table of accelerated query table (step 430). s In the example of FIG. 3*a*-3*e*, dictionary 176-B evaluated for column 176 ("supplier name") of accelerated query table 17 is used for compressing column 166 ("supplier name") of intermediate table 16 which is parent to of accelerated query table 17. Thus, alphanumerical entries of column 166 are "translated" into hexadecimal code using dictionary 176-B.

Step by step, all columns of accelerated query table 17 are analyzed and compressed to their minimum so that their data content requires as little space of in main memory 310 as possible, and the metadata calculated in the course of this analysis are used for compressing the corresponding columns of the parent tables 12, 16 (loop 450). This loop 450 may be carried out in such a way that metadata are not only used for compressing the direct parent tables, but all tables related by an ancestry relation; thus, metadata computed for the "product name" column 172 of accelerated query table 17 are used for compressing all the "product name" columns 162, 132 and 122 of intermediate table 16, PRODUCTS table 13 and SALES table 12, respectively.

Finally, the optimally compressed accelerated query table 17' obtained from original (uncompressed) accelerated query table 17 as well as the metadata used for compression are stored in main memory 310, and the compressed parent tables 12', 16' (as computed by using the metadata evaluated from accelerated query table 17 in step 440) are stored in external storage device 330 (step 460).

The sharing of metadata among column definitions of tables 17, 16, 15, 13 and 12 is possible since the joined tables 16, 17 are derived from the same underlying base tables 12, 13 and 15. This may not be evident at first sight, since the derived columns do not actually hold the same data as their base counterparts. Notably, a column of a referenced table 16 that is joined into an accelerated query table 17 by a foreign key reference on its table may have significantly different value frequencies as part of that table, because the frequency of references to the corresponding primary keys is multiplied in, and some values may not be present at all in the view (if their corresponding primary keys were never referenced). A column that is joined into a view by an outer join may even change its actual data type (the type becomes nullable), so that a simple sharing of all catalog metadata is not always possible.

As an example, it will be recalled that the metadata 176-B calculated as part of step 420 is geared at yielding optimum compression for column 176 of accelerated query table 17.

This metadata 176-B may however not be optimally suited for compressing column 166 of parent table 16. For example, while many sales may be related to "Drillo Corp." products (corresponding to frequent occurrences of "Drillo Corp." entries in final joined table 17), "Drillo Corp." may in fact only have few products (which would correspond to a small number of occurrences of "Drillo Corp." in column 166 of intermediate join table 16). Thus, compressing column 166 of intermediate join table 16 with metadata 176-B generated for column 176 of accelerated query table 17 may yield less than optimal compression in intermediate table 16.

Still, the amount of (sub-optimal) compression achieved in parent tables 16, 12 by using metadata of accelerated query table 17 may be adequate. Parent tables 16, 12 need not be stored in main memory 310, but are kept on disk 340 where storage space is less restricted. Thus, while it is still desirable to compress the data within the columns of these tables 12, 16, it is not necessary to have optimum compression. Rather, it is desirable to have some compression at no additional cost. The frequency-partitioned dictionary compression associates a significant amount of metadata with each column of each table in the represented database scheme and is expensive to compute. Thus, the advantage of being able to use pre-calculated metadata of related accelerated query table 17 for compression of tables 16, 12 outweighs the disadvantage of obtaining sub-optimal compression.

In general, method 400 provides metadata optimally suited for compressing an accelerated query table 17 and reuses the metadata (frequency partitioning schemes 176-A etc. and dictionaries 176-B etc.) for compressing columns of the base tables 12, 13, 15 and intermediate melted tables 16 from which accelerated query table 17 was generated by successive join operations. While these tables 12, 13, 15, 16 are kept in storage, they are used only for update processing and do not need to be kept in main memory 310 entirely because the performance requirements on update processing are not as high as for queries. Also, by definition, these tables (being normalized or only partly denormalized) have a smaller data volume than the accelerated query table 17 into which they are denormalized, so that optimal compression efficiency is of minor importance.

Moreover, the similarity of the underlying related columns (e.g. 166 and 176) is usually good enough that a system can benefit from sharing parts of the metadata between associated columns in accelerated query table 17 and associated base/join tables 16 etc. to improve overall efficiency and to provide the best overall performance. Specifically:

for a set of n column definitions which correspond to the same underlying base table data, only m different metadata are kept, with m<n (and typically m=1);

for each derived column definition, the "nearest" associated metadata is chosen from the m applicable definitions such that an optimal overall performance is obtained.

As shown in FIG. 3e, all base tables 12, 13, 15 as well as intermediate join table 16 are always joined fully (i.e. with all its columns) into an accelerated query table 17 for query processing over at least one join path (otherwise these data does not need to be stored in the first place). Thus, for any column of the underlying base tables and intermediate join tables, there exists always at least one applicable metadata definition (namely, the metadata of the corresponding column of the accelerated query table 17).

A cell contains values of the same code length and therefore represents a logical unit of the data. As to the definition of cells, reference may be made to "Constant-Time Query Processing" by V. Raman et al., Data Engineering, ICDE 2008, IEEE 24th International Conference on Data Engineering, p. 60-69, the contents of which are incorporated herein by reference in their entirety. By nature, the total number of cells of a given column 176 of accelerated query table 17 (and thus the number of bars 179 and the number of codes 180 determined/assigned during the frequency partitioning dictionary procedure) is always larger or equal to the number of cells of the base and join tables 12, 13, 15, 16 which use the dictionaries 176-B for compression. Therefore, the partitioning on the accelerated query table 17 can be chosen with the maximally efficient number of cells, without risking an intractably large number of cells on a related base/join table 12, 13, 15, 16. On the other hand, the number of cells on a base/join table 12, 13, 15, 16 can be considerably smaller (because they contain only a subset of the partitioned columns), but the resulting loss in compression efficiency is acceptable because these tables contain a lot less data. Also, the cell-related overhead becomes more important with smaller tables, which is also reduced by the smaller number of cells.

Besides the criterion of direct usage by a query, various different criteria can be used/generated to determine a table (or tables) which is (or are) to be stored in main memory 310. Whichever table ends up stored in main memory 310 generates the metadata which will be used for compressing the columns of tables other tables within this table's direct lineage. Sharing metadata between related columns (e.g., of intermediate joined table 16 and the related projection in accelerated query table 17) is thus generally possible in both ways. One table serves as the "master" from which the metadata is computed (e.g., by providing the value frequencies and dictionaries), while the other table re-uses these metadata which, while it is not perfectly appropriate, is "good enough" for data compression. For example, if intermediate joined table 16 were to be stored in main memory 310 and accelerated query table 17 were to be stored on disk 340, compression would be carried out with respect to the columns 162 and 165-167 of intermediate joined table 16, and the metadata computed in this compression would be used for compressing the corresponding columns 172 and 175-177 of accelerated query table 17. In this case, compression of intermediate joined table 16 would be optimal while compression of accelerated query table 17 would be sub-optimal.

Method 400 enables efficient data storage in a database computer system 300 since the amount of memory needed for metadata storage is reduced, resulting in a better system scalability. Moreover, since compression-related metadata is shared between multiple related column definitions (which use the same compression partitioning and dictionaries), some operations that involve values from the different columns become more efficient because they can be performed in code space, thus avoiding the need of intermediate decoding/encoding steps. This applies particularly to the equijoin operation which is very important and performance relevant in data warehouse applications.

As a beneficial side effect, redundancies are reduced in the catalog that stores and maintains the schema information for each joining level. Thus, inconsistencies between multiple levels of joined tables simply cannot occur.

In order to achieve optimal performance, column metadata should be shared only in those cases in which the sharing is indeed beneficial for the system's overall performance. There are three particular cases where column metadata is not shared between columns that are related to the same base values:

Whenever a base table which is joined into two different accelerated query tables, since this base table is (indirectly)

referenced by multiple fact tables. This is the case, for example, if both tables 16 and 17 of FIG. 2b were to be used as accelerated query tables.

1. Whenever a base table is joined into one and the same accelerated query table by multiple different paths in the join graph ("role-playing dimension"). This would be the case, for example, if supplier country table 15 were to contain also customer country data). All (transitive) parents of such tables are also joined in multiple times.
2. Whenever a base table is defined to be a fact table for on-line query processing, even though it is referenced from another table by a "many-to-one" relation. This would be the case if both tables 17 and 12 of FIG. 2b were to be used as accelerated query tables. In this case, an additional accelerated query table needs to be constructed at the join depth where this additional fact table is joined in, even though it already forms part of a larger accelerated query tables when joined with the referencing table.
3. These three cases lead to multiple accelerated query table columns that relate to the same base table column, i.e., multiple tables originating from that same base column. In order to achieve optimal compression and query performance for all accelerated query tables in these cases, it is necessary to compute compression metadata separately for all accelerated query table columns, and therefore also for all of these multiple views generated from the same base column.

For the cases described above, the associated base and intermediate table columns can be represented by multiple different metadata definitions, corresponding to the multiple accelerated query table columns to which they are connected in the join graph. While any of them can technically be chosen as "master" for the metadata of the base and intermediate view columns, the resulting system performance is better if the "master" column is chosen in such a way that matches best with the actual value distribution of the base or intermediate table column. A simple but efficient heuristic rule-of-thumb for determining the "nearest" master column is the number of join levels and the row count difference between the associated tables. This assumes that tables that are "closer" in this regard are more likely to have a similar value distribution. Better heuristics can also take the histograms of the referencing ("foreign key") columns into account that link the column to its "master". These heuristics would prefer "master" columns that are linked over keys that have a higher cardinality and less skew in the reference histogram, again, both indicating that the value distribution of the column and its master is more likely to be similar.

Referring again to FIG. 1, logic system 325 of computing system 300 contains means for efficiently storing database tables in main memory 310 and in external storage devices 330. As depicted, logic system 325 generally includes Database Table Joining System 326, Metadata Computation System 327 and Column Processing System 328 (often a Column Compression) and Table Storage System 329. The systems shown herein carry out the functions described above.

Database Table Joining System 326 will generate a joined table (notably, an accelerated query table 17) from two (normalized or partly denormalized) tables 12, 16. Metadata Computation System 327 will compute metadata (e.g., histograms and dictionaries) related to processing the data within a given column of the joined table (notably, accelerated query table 17) generated in Joining System 326. Column Processing System 328 will use the metadata determined by Computation System 327 to process, for example to compress, the respective columns of joined table (notably, accelerated query table 17) and at least one of the (normalized or partly denormalized) tables 12, 16. Column Storage System 329 will store the compressed tables 12', 16', 17' thus generated in main memory 310 and in external storage device 330.

The invention can take the form of an entirely hardware embodiment, an entirely software embodiment or an embodiment containing both hardware and software elements. In a exemplary embodiment, the invention is implemented in software, which includes, but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code which must be retrieved from bulk storage during execution.

Input/output or I/O-devices (including, but not limited to, keyboards, displays, pointing devices, etc.) can be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for processing data contained in tables in a relational database, the method comprising:
   joining a first table and a second table into a joined table;
   determining metadata for at least one column of the joined table, wherein the metadata comprises a frequency of each value in the at least one column;
   using the metadata for processing data in the at least one column of the joined table, wherein processing data in the at least one column of the joined table includes replacing each value in the at least one column with a code based on the frequency of each value in the at least one column, wherein a length of the code is inversely related to the frequency of each value in the at least one column;

using the metadata for processing data in at least one column of at least one of the first table and the second table.

2. The method according to claim 1, further comprising:
performing the metadata determination is on a column in the joined table;
using the determined metadata for processing data in the column of the joined table; and
using the metadata for processing data of a column in the first table.

3. The method according to claim 1, further comprising:
performing the metadata determination step on a column in the first table;
using the determined metadata for processing data in the column of the first table; and
using the metadata for processing data of the joined table.

4. The method according to claim 1, wherein the metadata comprises column attributes.

5. The method according to claim 4, wherein the metadata comprises at least one of the following: data type of data in a column, scale of data in a column, precision of data in a column, encoding information of data in a column, statistical information of data in a column, logging-related information, and compression parameters of data in a column.

6. The method according to claim 1, further comprising compressing data in the at least one column of the table and compressing data in the at least one column of the at least one other table, wherein the metadata contains at least compression parameters.

7. The method according to claim 6, wherein the metadata comprises at least one of the following: a dictionary for translating values contained in the respective column into a code, and a histogram of values in the respective column.

8. The method according to claim 6, further comprising storing the compressed table from which the metadata was computed in a main memory of a computing system and storing other compressed tables in external storage devices of the computing system.

9. The method according to claim 8, wherein the joined table is an accelerated query table.

10. A data processing system for processing data contained in tables in a relational database, comprising:
a database table joining system configured to join a first table and a second table into a joined table;
a metadata computation system comprising a processor, the metadata computation system configured to determine metadata for at least one column of one of the following: the first table, the second table, and the joined table, wherein the metadata comprises a frequency of each value in the at least one column; and
a column processing system configured to use the metadata for processing data in the at least one column, and to use the metadata for processing data in at least one column of at least one other table of the following tables: the first table, the second table, and the joined table, wherein processing data in the at least one column of the joined table includes replacing each value in the at least one column with a code based on the frequency of each value in the at least one column, wherein a length of the code is inversely related to the frequency of each value in the at least one column.

11. A data processing system for processing data contained in tables of relational database, comprising:
a database table joining system comprising a processor configured to join a first table and a second table of the database into a joined table;
a metadata computation system configured to determine metadata for at least one column of the joined table, wherein the metadata comprises a frequency of each value in the at least one column; and
a column processing system for processing tables comprising the at least one column using the metadata, wherein processing tables includes replacing each value in the at least one column with a code based on the frequency of each value in the at least one column, wherein a length of the code is inversely related to the frequency of each value in the at least one column.

12. The data processing system of claim 11, wherein the column processing system comprises a column compression system configured to compress tables comprising the at least one column using the metadata, and wherein the data processing system further comprises:
a main memory storage space and an external device storage space; and
a table storage system configured to store the compressed joined table in the main memory storage space and to store the compressed first and second tables in the external device storage space.

13. A non-transitory computer readable storage medium having computer readable instructions stored thereon, that, when executed by a computer, implement the method of claim 1.

14. A non-transitory computer readable storage medium having computer readable instructions stored thereon, that, when executed by a computer, implement a method for processing data contained in tables of a relational database in a computing system, wherein the method comprises:
joining a first table and a second table into a joined table;
determining metadata for at least one column of one of the following: the first table, the second table, and the joined table, wherein the metadata comprises a frequency of each value in the at least one column;
using the metadata for processing data in the at least one column of the joined table, wherein processing data in the at least one column of the joined table includes replacing each value in the at least one column with a code based on the frequency of each value in the at least one column, wherein a length of the code is inversely related to the frequency of each value in the at least one column; and
using the metadata for processing data in at least one column of at least one other of the following: the first table, and the second table.

15. The storage medium of claim 14, wherein the method further comprises:
compressing data in the at least one column of the table and compressing data in the at least one column of the at least one other table; and
storing the compressed table from which the metadata was computed in a main memory and storing other compressed tables in external storage devices.

* * * * *